Nov. 30, 1971   J. F. SCHWARZ ET AL   3,623,421
HOT DOG STEAMER WITH WATER LEVEL CONTROL UNIT
Filed April 24, 1970   4 Sheets-Sheet 1
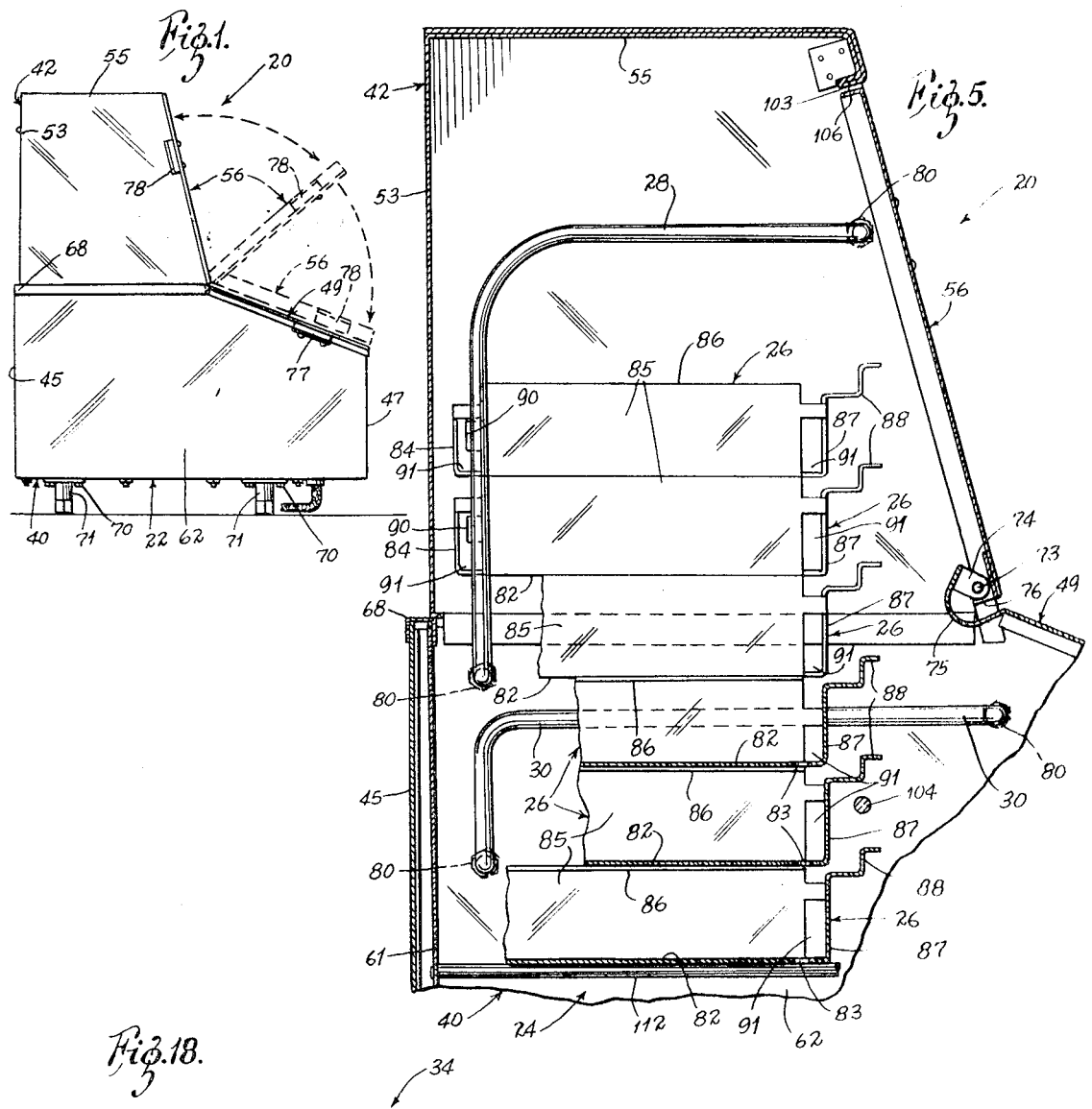
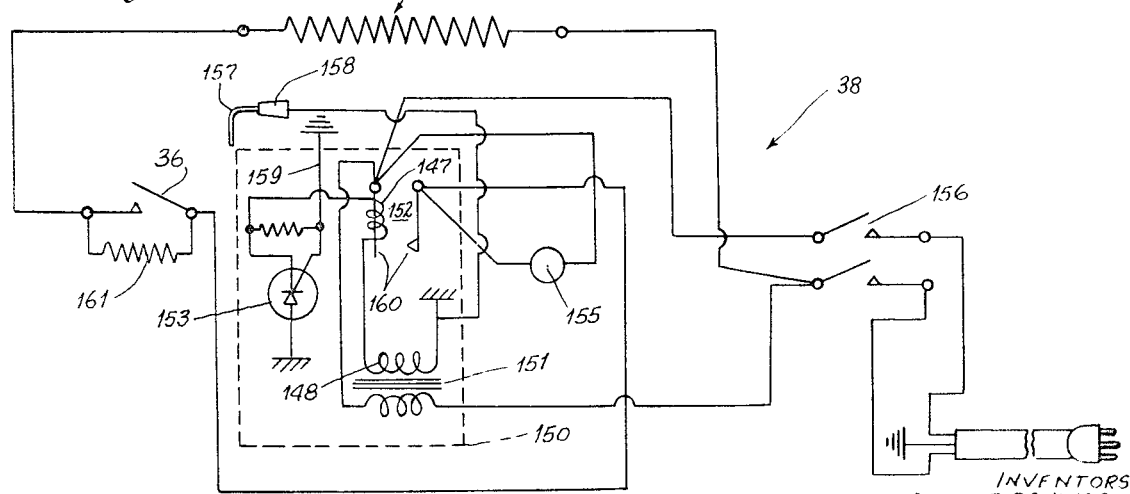
INVENTORS
JOHN F. SCHWARZ,
RALPH J. TINKHAM,
By Kingsland, Rogers, Ezell, Eilers & Robbins
ATTORNEYS

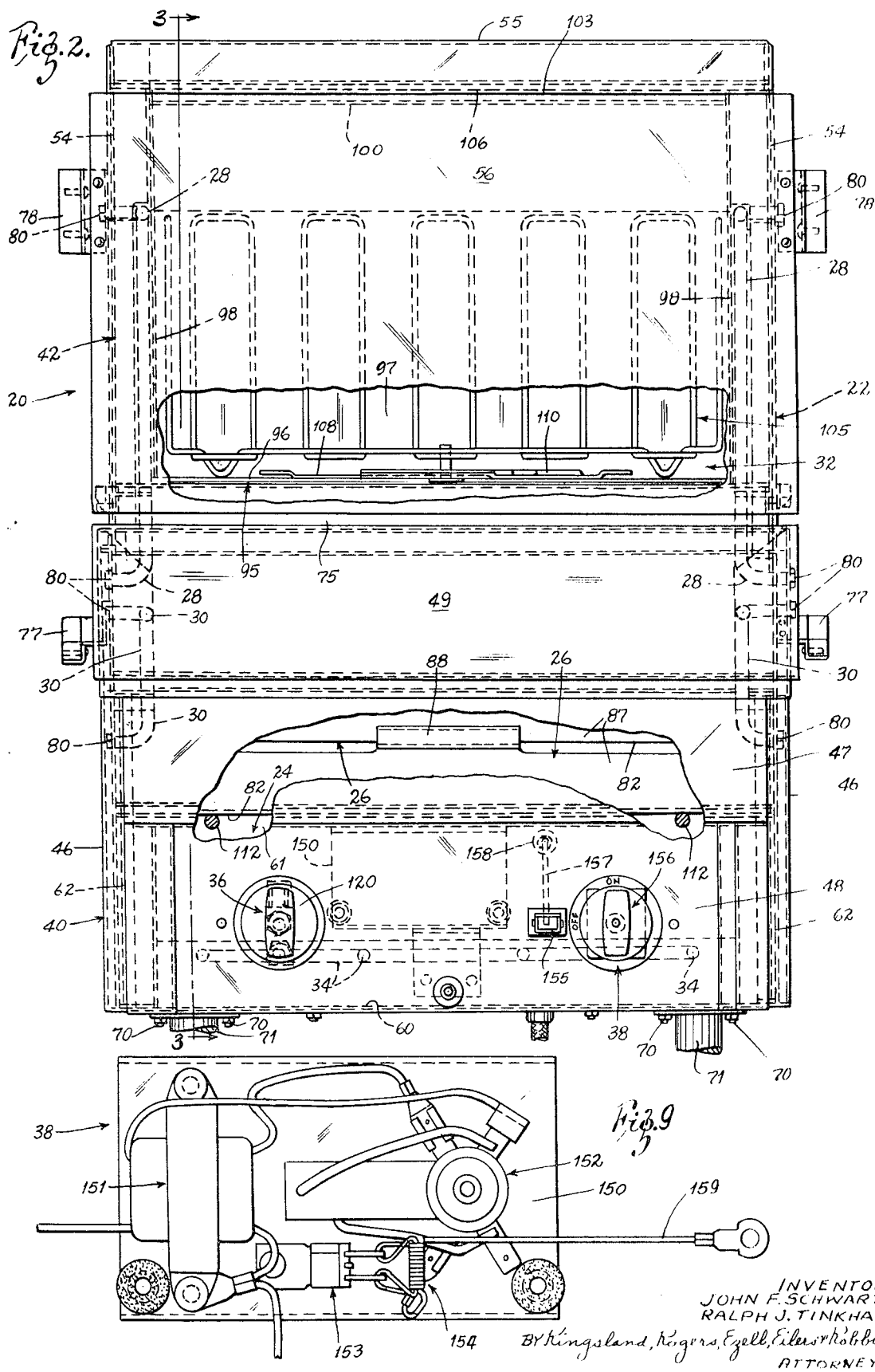

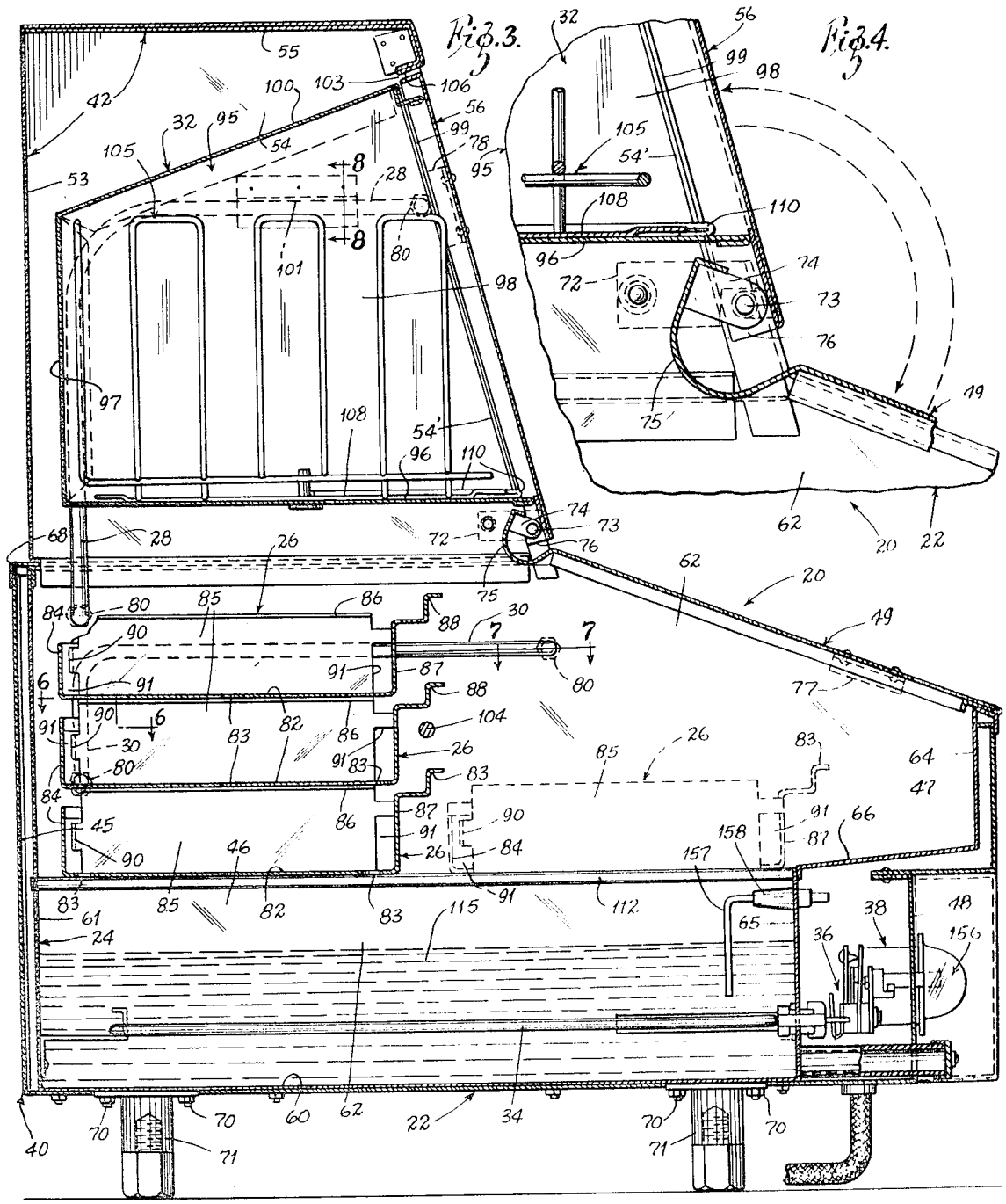

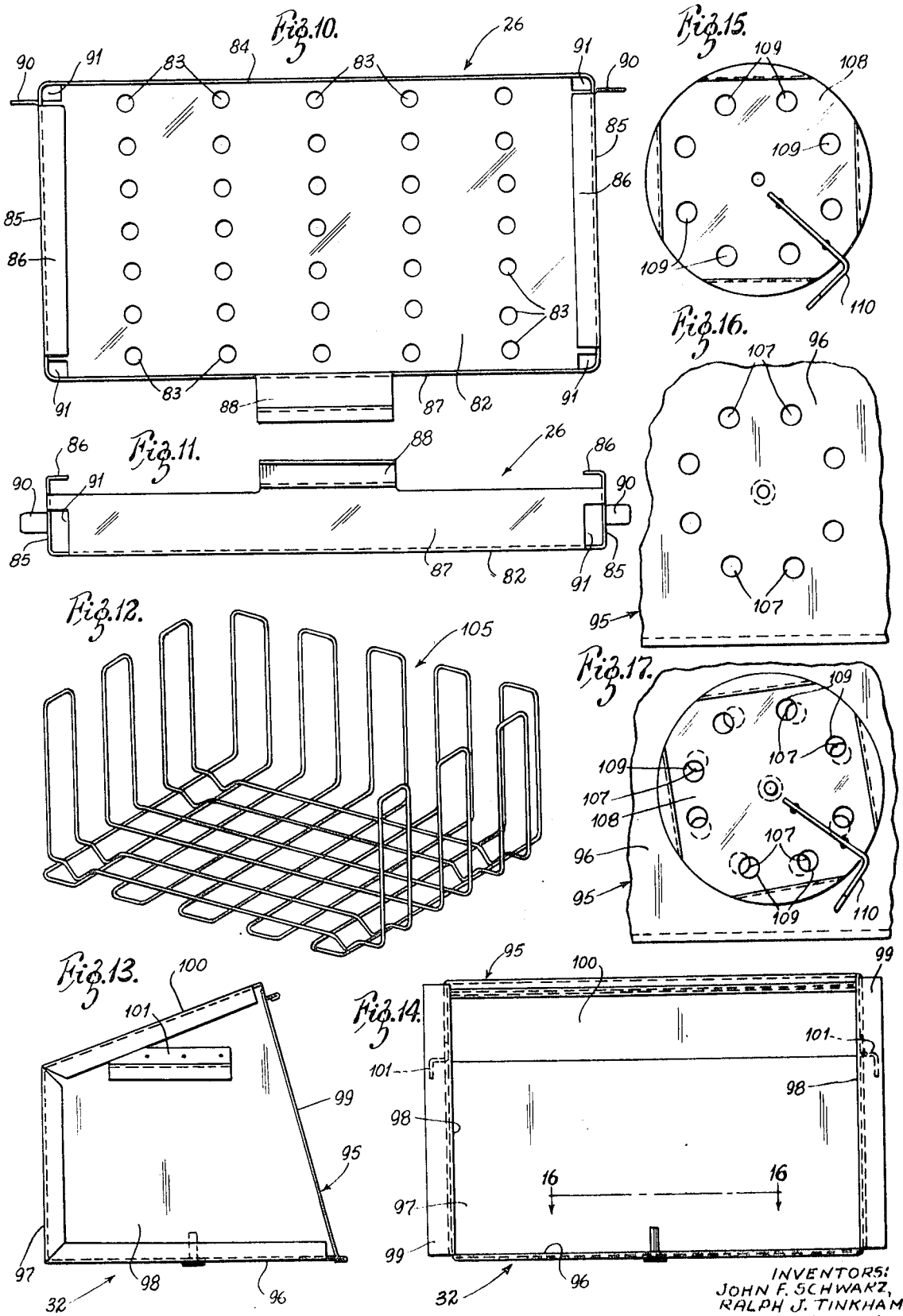

United States Patent Office 3,623,421
Patented Nov. 30, 1971

3,623,421
HOT DOG STEAMER WITH WATER LEVEL
CONTROL UNIT
John F. Schwarz, Affton, and Ralph J. Tinkham, Overland, Mo., assignors to Peabody Galion Corporation, Galion, Ohio
Filed Apr. 24, 1970, Ser. No. 31,576
Int. Cl. A47j 36/24
U.S. Cl. 99—234 A
13 Claims

ABSTRACT OF THE DISCLOSURE

The present structure is a novel hot dog steamer. Open apertured hot dog and other food receiving trays are stacked above a steam generating area. All but the bottom tray are retained against horizontal removal, the bottom tray being manually removable for dispensing of the steamed dogs and other food. Upon removal of the bottom tray, an additional tray of dogs may be stacked on top, thus providing first-in first-out dispensing of the dogs. A bun warmer may replace the upper several trays in the steamer cabinet. Pivotally mounted removable upper and lower doors selectively close the steamer cabinet for hot dogs steaming and provide access, as required. A novel water level control assembly is provided.

BACKGROUND OF THE INVENTION

(1) Field of the invention

The present invention relates generally to the commercial cooking apparatus art, and more particularly to a novel steamer for hot dogs and other food of the first-in first-out type including a novel water level control assembly.

(2) Description of the prior art

Many commercial steamers for hot dogs and other foods have been developed and many patents have been granted in this long existing art. In addition, many related commercial cooking mechanisms and structures have been devised and patents granted thereon. However, there has long existed the need in the commercial cooking field for a simple first-in first-out hot dog steamer positively functioning in this capacity, yet requiring little or no skill on the part of an operator to completely successfully manipulate the same in the steaming and dispensing of hot dogs and other fods. Applicants are not familiar with any hot dog steamers in the category of the present simple effective structure.

SUMMARY OF THE INVENTION

In brief, the present novel hot dog steamer includes a cabinet comprising upper and lower sections, each including a pivoted removable door. Integrated with the cabinet is a water pan in which is an electric heating element. Water temperature control mechanism and novel water level control mechanism are associated with the heating element. Stacked above the water level are apertured hot dog and other food receiving trays which are retained against generally horizontal removal by rods and cooperating tabs on the trays, except for the bottom tray which is free of the rods for manual generally horizontal removal and dispensing of the steamed dogs. Removal of the bottom tray permits the stack to drop by gravity, making space at the top for insertion of another tray of hot dogs. Thus, a first-in first-out dispensing of the dogs is positively dictated. A bun warmer may replace the trays in the upper section, if desired. A drippage catching hinge is provided with the lower section door. A novel water level control assembly is included which automatically deenergizes the water heating element upon the water level dropping below a predetermined point.

Objects of the present invention are to provide a novel first-in first-out steamer for hot dogs and other food which fulfills the long existing need in the art, which incorporates structure inducing the user to pull out and dispense the tray of dogs longest in the steamer in the simplicity of simply manually withdrawing the bottommost dog tray of the stack, which has large capacity for rush periods, which complies with all sanitation requirements in respect to the hot dog trays and other parts, which incorporates a minimum number of moving parts thereby reducing maintenance to the minimum and insuring long use with little down time, which includes a novel spillage deflector door hinge, and which otherwise fulfills the objects and advantages sought therefor.

Further objects are to provide a novel water level control assemblage which includes features insuring safety of an operator, which functions to protect the water heating element in deenergizing the same before the water level drops around and below the same, which is inexpensive, which is adapted to function for long periods of time without malfunction, which warns an operator that the water is low and the water heating element is deenergized, and which otherwise achieves objects and advantages sought therefor.

DESCRIPTION OF THE DRAWINGS

FIG. 1 is a diagrammatic side elevational view of a steamer for hot dogs and other foods incorporating the teachings of the present invention;

FIG. 2 is an enlarged front elevational view of the hot dog steamer of FIG. 1 including a bun warmer in the top or upper compartment and hot dog trays in the bottom or lower compartment, parts being broken away for illustration of details.

FIG. 3 is a vertical longitudinal cross-sectional view taken on substantially the line 3—3 of FIG. 2;

FIG. 4 is a further enlarged view of a fragment of FIG. 3, illustrating pivotal relation of the upper and lower doors of the respective compartments;

FIG. 5 is a view of a fragment of FIG. 3, illustrating hot dog trays in the upper compartment as well as in the lower compartment;

FIGS. 6 and 7 are further enlarged horizontal cross-sectional views taken on substantially the lines 6—6 and 7—7 of FIG. 3;

FIG. 8 is a further enlarged vertical cross-sectional view taken on substantially the line 8—8 of FIG. 3;

FIG. 9 is a view of the water level control assembly, less the probe,

FIG. 10 is an enlarged plan view of a hot dog tray;

FIG. 11 is a front elevational view thereof;

FIG. 12 is an enlarged isometric view of the bun basket;

FIG. 13 is a side view of the bun warmer housing;

FIG. 14 is a front elevational view thereof;

FIG. 15 is a plan view of the humidity control assembly of the bun warmer;

FIG. 16 is a fragmentary view of a portion of the bottom of the bun warmer housing taken on substantially the line 16—16 of FIG. 14;

FIG. 17 is a view similar to FIG. 16 with the humidity control assembly operatively mounted in the bun warmer housing; and FIG. 18 is a wiring diagram for the water control assembly.

DESCRIPTION OF A PREFERRED EMBODIMENT

Referring to the drawings more particularly by reference numbers, 20 indicates generally a steamer for hot dogs and other foods including the concepts of the present invention. Broadly, the novel steamer 20 includes a cabinet or housing 22, a water pan 24, hot dog trays 26, upper and lower opposed tray rods 28 and 30, respectively, and bun warmer 32, an electric water heating element 34, a water temperature control thermostat assembly 36, a novel water level control assembly 38, and coordinating elements.

The cabinet 22 is of the general configuration shown in FIGS. 1–3 and comprises a lower section 40 and an upper section 42. The lower section 40 includes a back panel 45, side panels 46, a front panel 47 having a lower inset panel 48, and a pivotally mounted removable door 49. Each of the panels 45, 46 and 47 has a top inwardly directed flange and a bottom inwardly directed flange by means of which the lower section 40 is mounted on the water pan 24, as is detailed below. The upper section 42 comprises a rear panel 53, side panels 54 having flanges 54' along the front edges directed towards each other, a top panel 55, and a pivotally removable mounted door 56. The upper section 42 also is mounted on the water pan 24, as appears below.

The water pan 24 comprises a bottom panel 60, a rear panel 61, side panels 62, and offset upper and lower front panel segments 64 and 65, respectively, connected by an integral near-horizontal panel 66. The water pan 24 is of integral construction, preferably of rust-proof metal. The upper edges of the panels 61 and 62 and of the panel segment 64 include spaced return flanges 68. The top portions of the panels 45, 46 and 47 of the lower section 40 including the inwardly directed flanges are disposed between such return flanges 68 and the panels 61 and 62, and the bottom inwardly directed flanges thereof are bolted to the pan bottom panel 60, as is clear from FIGS. 2 and 3. The lower edge portions of the panels 53 and 54 of the upper section 42 are welded to the top edge portions of the panels 61 and 62 of the water pan 24, as is clear from FIG. 3. Attached to the bottom of the water pan 24 by studs 70 welded to the bottom 60 and nuts are four adjustable feet 71. Manifestly, the specific construction of the cabinet 22 and incorporated pan 24 may take other forms.

The lower door 49 and upper door 56 are mounted for individual pivotal movement and for simultaneous bodily removal for cleaning of the doors and interior of the cabinet 22. The door 49 includes a trough 75 extending the width thereof, to the ends of which are secured arms 74. To one arm 74 is secured an outwardly directed stud or pintle 73, the other arm 74 having an aperture in axial alignment with the stud 73. The upper door 56 has spaced arms 76, to one of which is secured an outwardly directed stud 73, the other arm 76 having an aperture in axial alignment with the stud 73. Thus, the doors 49 and 56 may be assembled by sliding one door laterally in respect to the other to extend the stud 73 of the door 49 through the aperture of the door 49, and disengaged by the reverse procedure. With the engaged doors 49 and 56 operatively mounted on the cabinet 22, the studs 73 are disposed in aligned slots in the front edges of the upper section side panels 54, and are maintained against removal by hook members 72 pivotally mounted on the outer faces of the side panels 54 adjacent the slots which hook over the studs 73. The doors 49 and 56 may be individually pivoted as indicated in FIGS. 1 and 4. Removal of the engaged doors 49 and 56 is accomplished after unlatching movement of the hook members 72. Handles 77 and 78 are provided on the doors 49 and 56, respectively.

The opposed upper tray rods 28 are secured at their upper ends to the side panels 54 and at their lower ends to the side panels 62 by machine nuts 80 or reduced threaded portions, and the opposed lower tray rods 30 are secured similarly to the side panels 62 (FIGS. 2, 3, 5 and 7). As is clear from the drawings, the rods 28 and 30 include horizontal portions for guiding a tray 26 into steaming position and vertical portions for retaining trays against removal, as is more particularly described below.

Each hot dog tray 26 is of the configuration clearly shown in the drawings. Particularly noting FIGS. 10 and 11, each tray 26 is made from a single sheet of material formed to provide a bottom 82 with spaced apertures 83 for steam and drainage, a back wall 84, side walls 85 each with an inwardly directed horizontal flange 86, a front wall 87 with a pull handle 88, and opposed tray rod engaging tabs or wings 90 extending from the side walls 85 near the back wall 84. A cut-out 91 at each corner eliminates the food catching corners and makes cleaning easy, thus providing a sanitary food tray.

The bun warmer 32 includes a housing 95 of the configuration clearly shown in FIGS. 2, 3, 13 and 14 comprising a bottom 96, a rear panel 97, side panels 98 each with an outwardly directed flange 99 along the front edge, and a top panel 100. An elongated supporting bracket 101 is welded to the outer surface of each side panel 98 formed to fit over and slide on the horizontal portion of an upper rod 28 (FIGS. 3 and 8). The two brackets 101 support the bun warmer 32 with the bottom 96 level. The flanges 99 limit inward movement of the warmer 32 into the upper section 42 and prevent entry of extra steam into the warmer 32 by substantially sealing engagement with the flanges 54' of the panels 54 (FIG. 3).

A bun receiving open basket 105 fabricated by welding stainless steel wire elements is removably disposed in the housing 95.

A ring of apertures 107 is formed in the bottom 96 (FIG. 16). A disc 108 with a like ring of apertures 109 is pivotally mounted on the bottom 96 for selective manual rotation through a handle 110 spot welded to the disc 108 for humidity control in the bun warmer 32 (FIGS. 2, 15 and 17). Steam rises and passes into the warmer 32 through the apertures 107, the amount depending in general on the selected setting of the disc 108. Similarly, steam passes through the tray apertures 83 to envelope and steam the hot dogs.

The bun warmer 32 is spaced from the trays 26 and from the panels 53, 54 and 55 of the upper section 42, so that generated steam rises up and around the same, maintaining substantially the same temperature outside as in the warmer 32, reducing condensation to a minimum. Steam flow around the warmer 32 and around trays 26 is aided by an opening 103 between the top edge of the upper door 56 and a return flange 106 of the top panel 55.

It is clear by reference to FIGS. 3 and 5 that the cabinet 22 may be loaded with hot dog trays 26 in both the lower section 40 and the upper section 42 (FIG. 5), or with trays 26 in the lower section 40 and the bun warmer 32 in the upper section 42. Assuming the latter situation, several trays 26, as the three shown in FIG. 3, are successively guided along the horizontal portions of the lower rods 30 by the tabs 90 and lowered as the tabs 90 descend behind the vertical portions of the rods 30 into stacked relation. The bottom tray 26 will rest on two longitudinally extending rods 112 in position below the bottom ends of the rods 30, and can be manually pulled along the rods 112 from beneath the stack of trays 26, permitting such stack to drop by gravity onto the rods 112. The tabs 90 engaging the rods 30 prevent other trays 26 from moving forward. In addition, pins 104 mounted in the side panels 62 prevent the second from bottom tray 26 from creeping forward as the stack tilts rearwardly as the bottom tray 26 is pulled out. Tilting disposes the tabs 90 of the second from bottom tray 26 below the rods 30 before the bottom tray 26 is free of it, hence, the latter tends to move the former forwardly a bit. Thus, there is a desirable first-in first-out dispensing of the steamed hot dogs insuring continuous fresh loading. Another tray 26 of hot dogs may be slipped at once into position on top of the stack along the rods 30. The bun warmer 32 is slipped into position along the rods 28 through the brackets 101 before or after stacking the trays 26. The provision of the separate lower rods 30 spaced a little below the upper rods 28 makes possible tray stacking beneath a bun warmer 32.

If only hot dog steaming is desired, trays 26 of hot dogs are stacked by sliding some into position using the rods 30 and then additional ones are added using the rods 28 (FIG. 5). This provides a large capacity, so that a hundred hot dogs can be steamed and dispensed in a cycle of one-half hour in one steamer 20.

Water 115 is maintained at a predetermined manually set temperature in the water pan 24 under automatic operation of the thermostat assembly 36 which energizes the water heating element 34, as required, provided current is available in the concerned circuits, in accordance with the position of its manually rotatable control dial 120.

Referring to the novel water level control assembly 38 and its wiring diagram, FIGS. 9 and 18, respectively, a chassis or plate 150 supports an isolation transformer 151, a thermoswitch 152, a silicon control rectifier 153, a bias resistor 154, and associated wiring. A low water warning light 155 and an on-off switch 156 through which line current flows when closed are mounted on and extend through the front itset panel 48, which are electrically connected to the water level control assembly 38. A water level probe 157 is mounted through an insulative bushing 158 secured to the lower front panel segment 65 (FIG. 3). The probe 157 is electrically connected to the chassis 150 at 159, the chassis 150 being mounted on the inner face of, but insulated from the panel 48. The probe 157 makes connection to the water pan 24 through the water 115, the circuit being completed through the lead 159 (FIG. 18). It will be noted that the probe 157 extends down into the water 115 to a point a short distance above the element 34 so that deenergization of the element 34 occurs automatically when the water 115 drops below the probe 157, yet still covers the element 34.

An isolated low voltage closed loop is formed by the secondary 148 of the transformer 151, the heating coil 147 of the thermo switch 152, the anode and base of the silicone control rectifier 153. When the gate of the silicone control rectifier 153 is properly energized, current flows through the silicone control rectifier 153 and the rest of the closed loop components. This current heats the heating coil 147 in the thermo switch 152, causing auxiliary contacts 160 to close, thereby energizing the steamer heating element 34 and turning off the light 155. The probe 157 is in a low voltage circuit for safety of the operator.

Should the water level drop below the end of the probe 157, the potential is removed from the gate circuit of the silicone control rectifier 153, thereby turning off the current by a reverse of the foregoing process. The warning light 155 is turned on at the same time the heating element 34 is turned off. A resistor 161 is provided in the circuit of the thermostat assembly 36 to enable the warning light 155 to function regardless of whether the thermostat assembly is on or off.

It is understood, of course, that the switch 156 is turned to "on" position to provide current for the water level control assembly 38, the thermostat assembly 36 and the electric heating element 34. With current thus supplied, the assemblies 36 and 38 thereafter function automatically, the former to maintain the desired water temperature during operation, and the latter both to warn operating personnel and to deenergize the element 34 when water is low. The assembly 38 thus protects the electric heating element 34 against damage in deenergizing it upon water getting low, since such elements pit, scale and crack open when operated with the upper portion dry at 1000° F. and the lower portion in the lowering water at 212° F. This destruction of water heating elements has long been a serious problem.

Water is supplied manually to the pan 24 in the disclosed steamer 20, but the water level control assembly 38 is adaptable to a tapped water valve.

It is manifest that there has been provided a novel hot dog steamer and a novel water control unit therefor which fulfill the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. A steamer for hot dogs and other foods comprising, in combination, a cabinet, means in said cabinet for supporting a stack of hot dog and the like trays, a stack of hot dog and the like trays on said supporting means, and means retaining said stacked trays, except the bottom tray, against removal on generally horizontal planes, said bottom tray being manually slidable on a generally horizontal plane from beneath said stack of trays and removable from said cabinet.

2. The combination of claim 1 and including means for generating steam, and means for enveloping dogs and the like on said trays in the generated steam to prepare them for dispensing.

3. The combination of claim 2 in which said retaining means includes substantially upright laterally spaced rods mounted in said cabinet, and means on said trays engageable with said rods preventing outward withdrawal.

4. The combination of claim 3 and including means for guiding trays into position for stacking.

5. The combination of claim 4 and including a bun warmer removably supported in said cabinet above said trays.

6. The combination of claim 5 and including an upper door for access to said bun warmer and a lower door for access to said trays, said doors being pivotally and readily removably mounted.

7. The combination of claim 5 in which said tray retaining laterally spaced rods are in vertically spaced pairs permitting tray stacking from the top of each pair, the second pair being below said bun warmer.

8. The combination of claim 4 and including at least one door, said door being pivotally and readily removably mounted.

9. The combination of claim 2 in which said steam generating means includes a water pan, an electric heating element, water temperature control means, and water level control means.

10. The combination of claim 1 in which each tray includes a plurality of apertures to pass steam to food, cutouts at the bottom corners for sanitation, stacking flanges, a pull handle, and lateral retainer flanges.

11. The combination of claim 1 and including means for generating steam including a water pan, an electric element in said pan, means for energizing said electric element, and means for automatically denergizing said electric element upon water in said pan dropping below a predetermined level.

12. The combination of claim 11 in which said predetermined level is above the electric heating element to maintain the same water covered.

13. The combination of claim 12 in which said automatic deenergizing means includes an electric probe extending into the pan to a point above said electric element, and a water level control assembly including a chassis mounted on and insulated from a cabinet wall, a transformer on said chassis, a thermo-switch on said chassis including a heating coil in a circuit with the secondary of said transformer, a silicone control rectifier and a bias resistor on the chassis, said electric probe, said rectifier and said resistor also being operatively connected in said secondary circuit, said thermo-switch being in a line circuit with said electric element, said thermo-switch closing said line circuit when closed by its heating coil and opening said line circiut when open due to deenergization of its heating coil.

References Cited

UNITED STATES PATENTS

| | | | | |
|---|---|---|---|---|
| 1,050,452 | 1/1913 | Griffin | | 126—369 |
| 1,809,867 | 6/1931 | Rittberger | | 99—234 A |
| 1,837,924 | 12/1931 | Rutherford | | 126—369.1 |
| 2,574,950 | 11/1951 | Ben-Dor | | 126—369 |
| 3,209,671 | 10/1965 | Blacker | | 99—234 A |

ROBERT W. JENKINS, Primary Examiner

U.S. Cl. X.R.

126—369